United States Patent Office 3,316,057
Patented Apr. 25, 1967

3,316,057
METHOD OF TREATING EXHAUST GASES OF INTERNAL COMBUSTION ENGINES
Benjamin W. Howk, West Chester, Pa., and Alvin B. Stiles, Wilmington, Del., assignors to E. I. du Pont de Nemours and Company, Wilmington, Del., a corporation of Delaware
No Drawing. Original application May 19, 1961, Ser. No. 109,483, now Patent No. 3,216,954, dated Nov. 9, 1965. Divided and this application June 22, 1965, Ser. No. 466,069
6 Claims. (Cl. 23—2)

This application is a divisional of our co-pending application U.S. Ser. No. 109,483, filed May 19, 1961, now Patent No. 3,216,954, issued Nov. 9, 1965.

Application Ser. No. 109,483 is a continuation-in-part of our then copending application U.S. Ser. No. 59,392, filed Sept. 29, 1960 and now abandoned, which is a continuation-in-part of our then copending application U.S. Ser. No. 828,778, filed July 22, 1959, and now abandoned.

This invention relates to the treatment of combustion products containing nitrogen oxides, carbon monoxide, and hydrocarbons and is more particularly directed to the catalytic treatment of automobile exhaust gases by passing the gases over a mangano-chromia-manganite catalyst.

In the catalytic treatment of automobile exhaust gases, it is impractical to use catalysts that require a high exhaust gas temperature to initiate reaction because automobiles operate much of the time in city driving and at comparatively low exhaust temperatures. The mangano-chromia-manganite catalysts used in the present invention light-off at relatively low temperatures even after extended use so that they are practical and effective under ordinary conditions of motor vehicle operation. The catalysts used in this invention are also effective in "fusing" the operation of catalysts which require a higher light-off temperature because the manganite catalysts begin operating at a low temperature and heat the catalyst bed and exhaust stream.

The determination of light-off temperature is difficult because it is not a definite figure but rather depends upon a variety of operating conditions such as gas composition, gas velocity, heat losses, and the like.

Light-off temperatures mentioned herein are determined arbitrarily by passing a 1% ethane gas over the catalyst and are defined as the temperature required to oxidize 90% of the ethane. This is taken as the light-off temperature because it is thought it will bear a close correlation to the actual temperatures of light-off in operation.

Catalysts effective for treatment of waste gases resulting from the combustion of hydrocarbon fuels are ordinarily extremely sensitive to water. Liquid water, as well as water vapor, is found in the exhaust gases of motor vehicles and in other such combustion systems. The liquid water causes spalling of the catalyst and weakens them mechanically so much that after very short periods of operation they are no longer useful. The mangano-chromia-manganite catalysts used in the present invention are quite resistant to damage from liquid water and water vapors.

Moderately effective systems have been devised for the handling of exhaust gases of motor vehicles providing the motors are operated on carefully selected fuels. A commercially satisfactory catalyst should be resistant to lead, sulfur, halogens, phosphates, boron, and their reaction products, and to hydrocarbon fuels and oils and their partial combustion products. Such a catalyst should also be resistant to manganese compounds which are sometimes used as anti-knock agents. The catalysts used in the present invention have remarkable resistance to such constituents often found in auto exhaust. They are also quite resistant to deactivation by high temperatures because of their composition and structure.

It is imperative that a satisfactory catalyst be effective for the oxidation or reduction of as many as possible of the numerous components in the waste gases being treated. The mangano-chromia-manganite catalysts used in the present invention are effective in converting the nitrogen oxides, carbon monoxide, the hydrocarbons, and other exhaust gas components and are thus broadly effective.

It will be noted that some catalysts used in the invention are somewhat less effective in converting nitrogen oxides than others but they are nevertheless valuable for the conversion of carbon monoxide and hydrocarbons.

It will be seen that exhaust gases can be converted in a plurality of stages. Thus the reduction of nitrogen oxides can occur in a first stage and then oxygen can be added in the second stage for the oxidation of carbon monoxide and hydrocarbons. The same or different catalysts can be used in the two or in the plurality of stages.

An air compressor driven by the motor can be used for supplying an excess of 30% or more over that stoichiometrically required to react with the hydrocarbons and carbon monoxide. Alternatively, a Venturi can be used. As mentioned earlier, the addition of air at a later stage may assist in reaching a light-off temperature since the air if introduced sooner would otherwise have a cooling effect.

It is imperative that a satisfactory catalyst have a reasonably small volume so that it can be conveniently carried by a motor vehicle without requiring an unreasonable amount of room. Another practical consideration is that the catalyst should have a reasonably long service life, though this can be balanced somewhat against low cost. The catalysts used in the present invention are relatively inexpensive, have a surprisingly long life, and are effective in relatively small amounts.

The mangano-chromia-manganites used in the method of this invention are described in detail and claimed as catalysts as such and with co-catalysts, interspersants, and supports in our copending parent application identified in the first paragraph above. The entire disclosure of the parent application is hereby incorporated by reference. A general description of the catalysts should be sufficient here.

The mangano-chromia-manganites have the following empirical chemical composition:

$$XCr_2O_n \cdot 2YMnO_m$$

in which $n$ can be 2, 3 and 6 and $m$ can be 1, 1.33, 1.5, 2 and 2.5. The Mn:Cr ratio can vary from 3:0.5 to 3:30. The atomic ratio, that of Y:X, is substantially the same and thus when Y equals 3, X can equal 0.5 to 30.

The empirical formula is a summation of the proportion of the content of MnO, $MnO_2$, $Mn_2O_3$, $Mn_3O_4$, 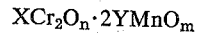 $Cr_2O_3$, $Cr_2O_3 \cdot MnO_2$, $CrO \cdot Mn_2O_3$, $CrO_3 \cdot MnO$ $Cr_2O_3 \cdot MnO$ in the catalyst.

In addition to the above oxides, a mangano-chromia-manganite catalyst quite possibly contains still other oxides of manganese, of chromium and of chromium plus manganese which are not known compounds and which are not subject to positive identification by any means now available. Thus, $Mn_2O_5$ may be present when the state of oxidation of the catalyst is high and other oxides of similar, unusual character may also exist in a transitory and at this time unidentifiable form.

While any of the mangano-chromia-manganites as described can be used in preparing catalysts according to the present invention, it is much preferred to use those in which the ratio of Y:X is either above 3:3 or below 3:2. The weight ratio of Y:X, that is Mn:Cr, is preferably 3:0.5 to 3:1.5 and 3:3.5 to 3:30. Mangano-chromia-manganites thus constituted are far more valuable and thermally stable as catalysts than those having a ratio of 3:2 to 3:3 and can be used even without the interspersants which will be described hereafter. If the ratio is around 3:2 to 3:3 interspersants must be used.

A mangano-chromia-manganite having a ratio of Mn:Cr of 3:2 can be prepared according to the method of Wortz U.S. Patent 2,108,156. The products are designated there as "manganese chromites." This designation can be used for the catalysts used in this invention when the Mn:Cr ratio is 3:2.

Mangano-chromia-manganites having the full range of ratios of manganese to chromium can be prepared by procedures described in detail in our copending parent application. Generally it can be said that they are prepared by reacting appropriate salts of manganese and chromium in aqueous solution. Thus, manganese nitrate and chromic acid anhydride are dissolved in water and ammonia is added to make a precipitate. The products of high manganese ratio can be prepared by adjusting the amounts of components but a high chromium product can be made when a hexavalent chromium salt is used as a chromium source only by adding further chromium compounds such as ammonium chromate to the precipitate thus prepared after filtration. Alternatively the appropriate proportion of suitable salt such as manganese nitrate with chromium nitrate can be precipitated or fused together to give mangano-chromia-manganites of the desired Mn:Cr ratio.

The mangano-chromia-manganite precipitates preferred according to the invention have a crystallite size no greater than 1000 Angstroms. Preferred catalysts can have a greater crystallite size as hereinafter discussed. The fact that the mangano-chromia-manganite is crystalline in form can be determined by conventional X-ray analytical techniques as can the order of crystallite dimensions. A suitable method is shown in X-ray Diffraction Procedures by H. P. Klug and L. E. Alexander, published by John Wiley & Sons, New York, 1954 edition. The preferred mangano-chromia-manganites of the invention have a crystallite size ranging downwardly from about 50 Angstroms or more broadly from about 400 Angstroms. The size will fall in the range below that figure and down to sizes where only a few molecules are associated but enough to establish a crystal pattern. The structure is inferable from electron diffraction, X-ray diffraction, or electron-micrograph, the most applicable method being dependent upon the crystallite size.

It is to be noted that X-ray diffraction and electron diffraction are not too informative if a particular catalyst contains large crystallites as well as small crystallites of the catalytically active materials. The large crystallites obscure the presence of the small which may nevertheless be present in amounts sufficient to make the catalyst satisfactorily effective—say even as low as 5 to 10%. In this event, crystallite size must be determined by another method such as electron-micrograph. Thus there is no objection to having large crystallites present in a catalytic aggregate of the invention providing only that there are a sufficient number of crystallites in the size ranges herein described so that the catalyst is suitably active and so that the interspersants are effective. In other words, crystallites of mangano-chromia-manganite, co-catalyst, and interspersants which are present in sizes well outside of the preferred ranges can be regarded as diluents which are largely inert and if not present in too large amount are not objectionable.

After catalysts have been in use for some time the crystallite size rises to considerably higher figures. When the size has risen to about 900 Angstroms the catalyst will be about one-half as effective as when it was put in service with a crystallite size around 50 Angstroms. One may initially use a catalyst in which the crystallites have a size up to 1000 Angstroms with a loss of effectiveness which can be compensated by using a larger amount of catalyst. Of course, the effectiveness drops off with further use and such catalysts are less desirable economically than those of smaller crystallite size as noted.

While it is greatly preferred to use mangano-chromia-manganite catalysts in which the crystallite size is initially below 1000 Angstroms and after use is still below 1000 Angstroms, economics will sometimes justify the use of catalysts with larger crystallite sizes. Thus a mangano-chromia-manganate of low Mn:Cr ratio and containing no added interspersant can be made quite inexpensively and after heating to about 800° C. for three hours or so will have a crystallite size by X-ray of around 1500 Angstroms. Even such a product shows considerable activity. Even higher crystallite sizes up to 2000 or even 2500 Angstroms or even higher can be used if low activity can be offset by other advantages such as low cost or if high reaction temperatures can be used. These are not, however, the most preferred catalysts of the invention.

It is noted that when it is said that crystallite size is less than 50 Angstroms, this means that using the X-ray or electron microscope techniques now available one obtains this apparent crystallite size determination. Actually some workers might obtain a figure of the order of, say, 60 or 75 Angstroms using the same techniques and the same sample.

Catalysts used according to the present invention can be composed essentially of mangano-chromia-manganite prepared as above and containing an interspersant as described below. It is preferred, however, that it be promoted and further modified with a second interspersant as described below.

Preferred catalysts for use in the invention contain a second catalyst in addition to the mangano-chromia-manganites. This can be any catalyst or mixture which has value in treating the gases converted according to the invention such as lead chromate, magnesium chromate, barium chromate, and strontium chromate. It is preferred to use base metal catalysts which are base metal chromites of

| Copper | Cadmium |
| Nickel | Cobalt |
| Iron | Tin |
| Zinc | Bismuth |

A co-catalyst can be selected from those shown in Lazier U.S. Patent 1,964,001 and the combination of mangano-chromia-manganite with the co-catalyst can be prepared as generally there described. However, it is suggested in the patent that a chromite mixture be heated to temperatures to make a mixed oxide-chromite product at temperatures in excess of 600° C. and this will result in sintering and reduction of catalytic efficiency. This aspect of the teachings of the patent should not be followed in making preferred catalysts of the present invention.

The base metal catalyst chromites are prepared in the same general manner as above described for mangano-chromia-manganites. Thus a water-soluble salt of one of the base metals as above mentioned is dissolved in the same solution with the manganese and chromium compounds as originally described and coprecipitated with them. The soluble salts can be the chlorides, sulfates, acetates, or nitrates of any of the base metals mentioned. Again, the amount of the chromium compound dissolved should of course be adequate to produce a proper ratio with the base metal. This should be a stoichiometric amount.

The precipitants mentioned above for precipitating mangano-chromia-manganite, such as ammonia, can at the same time effect coprecipitation of the base metal catalyst.

The crystallite size of the catalyst precipitate should be in a size range as already described for the mangano-chromia-manganite precipitates and as there stated should preferably be no greater than 1000 Angstroms and is preferably under 400 Angstroms and, even better, is less than 50 Angstroms.

Instead of being coprecipitated with the mangano-chromia-manganite, the base metal precipitate can be separately formed by use of a stoichiometric amount of the chromium compound and precipitation as with ammonium hydroxide or anhydrous ammonia. The two slurries thus formed can be brought together or the precipitates separately prepared can be dried, calcined and thereafter mixed. This latter, however, is not a preferred practice.

The proportions of manganite to the base metal catalyst can be widely varied. Generally the ratio of manganese to base metal should be about 1:1 and can range from 1:10 to 10:1 or even higher.

The process conditions used in the precipitation of mangano-chromia-manganite and, if used, the base metal catalyst should be controlled in order to obtain crystallites in the size range already indicated. Those skilled in the art are familiar with the process variables which result in differing particle sizes and so there is no great difficulty in obtaining crystallites of the sizes desired. In general, it may be said that to obtain small crystallites a comparatively low temperature is preferred, say room temperature, or a solution may even be cooled somewhat, particularly in warm weather. The presence of local over-concentration of the anhydrous ammonia or other precipitant should be avoided by rapid stirring or agitation. Again, this is well understood in the art. When it is understood what result is to be obtained, one skilled in the art can readily achieve it.

The preciptation should also be effected from a comparatively dilute solution. Ordinarily there should be used about one molar concentration with respect to the water, of the manganese salt, the chromium compound, the copper compound, and other materials to be coprecipitated. If much higher concentrations are used there is a tendency to favor the production of larger crystallites. Dilute solutions are also valuable because occlusion of impurities is minimized.

It will be understood that while the crystals are formed in the particle sizes desired, they precipitate as aggregates and agglomerates of loosely associated crystallites which can be separated from water as by filtration, centrifugation, or decantation.

While reference has been made above primarily to the use of co-catalysts which are coprecipitated chromates, it will be understood that catalytic metals can be added to the mangano-chromia-manganite catalyst systems in various forms. Thus they can be added as the oxides, carbonates, acetates, oxalates, or in any other form in which they have catalytic activity or can develop catalytic activity upon calcination. Thus compounds such as the following can be used as precipitates which are formed separately though in every instance it is preferable that they be in a particle size range such that the crystallite size is as described herein:

Copper oxide
Nickel oxide
Iron oxide
Zinc oxide
Cadmium oxide
Tin oxide
Bismuth oxide
Manganese oxide or dioxide As just noted above, the corresponding hydroxides can be used.

The mangano-chromia-manganite particles in catalysts of the invention have a tendency to grow in size. This growth occurs either by crystallite growth or by agglomeration, and the tendency is particularly great in use when the catalysts are heated to elevated temperatures. The mangano-chromia-manganite particles also have a tendency to agglomerate with the base metal catalyst, though this is not perhaps as great as the tendency to crystal growth.

To hinder such growth, preferred catalysts of the invention contain interspersants. These are comparatively inert particles of size comparable to that of the crystallites of the mangano-chromia-manganite. The interspersant is intimately associated with the manganite and co-precipitated co-catalyst, if any, and, being of a different crystal habit and size, hinders agglomeration and crystallite growth in later phases of the catalyst preparation and use.

The interspersant has the function as will be seen and which will be discussed further of keeping the crystallites of the catalyst and the co-catalyst apart. The interspersant could somewhat less aptly be called a dissident and they are randomly distributed among the crystallites of the catalysts. Generally, it may be said that the interspersant can be any refractory material, the crystallites of which are similar in size to those of the mangano-chromia-manganite. The interspersed refractories should have a melting point above 1000° C. and more preferably above 1600° C.

The interspersants which can be used include such water-insoluble precipitates as:

(1) Aluminum oxide and hydroxide
(2) Titania
(3) Thoria
(4) Ceria
(5) Chromia
(6) Magnesia
(7) Calcium oxide and hydroxide
(8) Barium oxide and hydroxide
(9) Strontium oxide
(10) Zinc oxide
(11) Manganese oxide
(12) Silica
(13) Beryllia
(14) Zirconia
(15) Lanthana
(16) Hafnia Aluminum hydroxide, which is present as oxide in the final product is preferred. Manganese oxide and chromia are listed as interspersants to be added in amounts exceeding those which would be present in the mangano-chromia-manganite of the ratios described.

Other insoluble compounds of the above metals can be similarly used such as barium chromate, calcium chromate, chrome oxides, calcium silicates, barium silicates, and magnesium aluminate. There can be used still other such insoluble compounds of the metals listed such as barium titanate, calcium titanate, manganese carbonate, aluminum chromite, magnesium, calcium, strontium and barium as silicates, aluminates, titanates, zirconates, and cerates.

It will be understood that some of the interspersants especially excesses of manganese oxide and chromia will have catalytic activity of their own, though this is not the primary reason for including them in the aggregates of the invention.

If the catalysts are to be used at temperatures which can be closely controlled and will not greatly exceed 700° C., silica can be used as an interspersant. Silica can be used in the form of any of the finely divided colloidal products such as silica sols or aerogels in which it is commercially available.

It will be understood that while the interspersant will normally be in the form of the oxide in the final catalyst aggregate after calcination, the crystallites can be introduced in the form of heat-decomposable salts. They can be formed in situ in the presence of the mangano-chromia-manganite catalyst and in the presence of the co-catalyst. Such heat-decomposable products can be used as:

(1) Aluminum nitrate
(2) Thorium nitrate
(3) Cerium nitrate
(4) Chromium nitrate
(5) Calcium hydroxide, nitrate and acetate
(6) Barium hydroxide and nitrate
(7) Manganese nitrate
(8) Zinc nitrate
(9) Strontium nitrate, hydroxides, acetates, and carbonates
(10) Magnesium nitrate, acetate
(11) Lanthanum nitrate
(12) Zirconyl nitrate Particles which can readily be introduced in the form of sols or dispersions in addition to those already listed above are:

(1) Magnesium oxide and hydroxide
(2) Titanium oxide, sol and gel
(3) Aluminum alcoholates
(4) Zircon powder
(5) Aluminum hydroxide gel
(6) Zirconia gel
(7) Cerium oxide
(8) Silica sol
(9) Zinc oxide and hydroxide
(10) Strontium hydroxide and oxide The ultimate particle size of the interspersants is as already described for the mangano-chromia-manganite precipitates above and is preferably less than 1000 Angstroms, preferably not more than 400 Angstroms, and it is still more preferred that the size be less than 50 Angstroms. Precipitates may be amorphous or crystalline, and for the purposes of the present invention this is comparatively unimportant so long as the ultimate paritcle size is of the correct order.

The methods of production of interspersants in suitable form requires no extended discussion because the preparation of colloidal dispersions of these types is well understood.

The interspersant can be used in widely varying amounts and can range from, for example, 5% to, say, 75% based upon the total weight of solids in the final precipitate or mixture of mangano-chromia-manganite plus base metal catalyst, if there is one present.

The coprecipitates or mixtures prepared as above are then calcined to produce a somewhat more porous structure. Calcination can be conducted at any of a wide range of temperatures from about 350° C. up to 500° C. or even higher. The temperature should in any event be below that at which sintering occurs and it should be sufficiently high to effect decomposition of the hydrates present.

After calcination, products as prepared above have somewhat open structure as described. They are preferably stabilized by the introduction into the structure of a second interspersant which is a refractory of a particle size suitable for such introduction. Thus chromic oxide, magnesium hydroxide and any of the interspersants as above described are introduced as a sol or a water-soluble salt which can be decomposed in situ.

For formation in situ one can use such water-soluble salts as those previously described as interspersants. It will be understood that the catalyst aggregates of the invention will contain the interspersants in a form of oxides because of the calcination which is part of the process of preparing such aggregates.

The particles of the second interspersant should preferably be within the size ranges previously described. Thus the particles should have a size under 1000 Angstroms, preferably not greatly in excess of 400 Angstroms and even better should be no larger than 50 Angstroms. Some such particles can be included which are larger, but they will serve more as supports than as second interspersants. It is observed that the second interspersant is ordinarily added after the catalyst aggregate has taken form and has been dried. Such second interspersants can also be termed "structural stabilizers."

The second interspersant can range in amount from 0.5% to 50% or so by weight of the combined weight of catalyst including the first interspersant.

When crystallite or particle size is mentioned it will be understood that the size intended is the average of the largest dimension. This is measured by X-ray or, for larger particles or for mixtures of sizes, can be measured and counted in an electron micrograph.

It is to be observed that the crystallite size of interspersants and of the catalyst, as well as of the mangano-chromia-manganite should all be below 1000 Angstroms and more preferably below 400 Angstroms, and even better under 50, as described generally elsewhere. It is further to be noted that it is advantageous to select an interspersant, a catalyst, and a second interspersant all of which have a different crystal habit from each other and from the mangano-chromia-manganite. It should also be observed that while it is greatly preferred to add a second interspersant after a drying or calcination step as described, one can instead in forming the catalyst aggregate use two interspersants which are heteromorphic, that is of different crystal habit. More than two can be used in either or both stages.

While it is much preferred, as just stated, that the interspersants all be of different habits, it is possible to make usable and valuable catalysts in which this is not true.

It will be noted that while we speak frequently of a second interspersant this is language adopted to refer to an interspersant added after the drying and calcination. It is not essential that there always be a first interspersant as will be illustrated in the examples. It is also to be observed that when manganese oxide or chromia are used as a second interspersant they can become a part of the spinel phase if the temperatures go high enough in subsequent heat treatments of the catalyst. Such temperatures are usually considerably in excess of those encountered in manufacture or use of the catalyst of the invention so that when added at this stage the manganese oxide or chromia can be regarded as serving primarily as interspersants rather than as part of the spinel phase.

Catalysts prepared as above described can be supported in the ways already well understood in the art. Thus, they can be applied as slurries to conventional supports and heat-treated as will hereinafter be described.

Suitable supports and carriers are:

(1) Porous ceramic spheres, tablets, or rings which have a softening or melting point in excess of 1200° C.
(2) Etched nickel, Nichrome, and Inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules The catalysts can also be applied to such a carrier or support by applying fusible compounds of the manganese, chromium, co-catalyst, and interspersant and fusing as generally above described.

The refractory is preferably heteromorphic to the catalyst and so far as practicable to interspersants in the refractory. Among the refractory supports discussed, the following when having appropriate surfaces can advantageously be used:

(1) Bauxite
(2) Zirconia
(3) Titania
(4) Activated alumina.

To obtain the effects described, the surface area ought to be at least 10 M²/g. with pore dimensions such that 40% are less than 200 Angstroms. Surface area and pore diameter are determined by standard methods used in catalysis and elsewhere. It is more preferred that the surface area be at least 80 M²/g. with pore dimensions of at least 60% less than 200 Angstroms.

The amount of catalyst to apply to such a refractory will depend upon the surface area of the particular refractory selected. Ordinarily the amount will run from about 2% for refractories of comparatively low surface area up to around 20% for refractories of high surface area. It will be evident that there is no great disadvantage to using too much catalyst except that it is wasteful because catalytic efficiency does not rise in proportion to the amount of catalyst used above a certain figure which can readily be determined for a particular catalyst and support.

Catalysts prepared and supported as just described are illustrated in many of the examples such as Examples 27 and 30 in which bauxite is used as the support material. The bauxite as used in those examples has a surface area of about 200 M²/g. and approximately 60% of the pores are under 200 Angstroms diameter.

Instead of supporting the catalysts as just described, they can be compressed into tablets or pellets. This can be done with conventional pelleting and tableting machinery. A pelleting lubricant should be used, such as powdered graphite or stearic acid. Other conventional lubricants can be used, and the amounts are those normally employed, say 0.1 to 2%, the exact amount being determined in accordance with customary practice.

The heat treatment results in the product becoming more porous. Volatile matter leaves the catalyst as a result of thermal decomposition and there is, more importantly, a structural orientation which brings the crystallites closer together and leaves larger voids between the groups of crystallites, all as seen in the drawing.

The temperature to be used should be selected to effect this modification, but should not be so high as to result in sintering of the catalyst components. More specifically, temperatures from about 250–800° C. will be satisfactory. The heating must occur for long enough to effect a desired degree of such orientation, and may vary from a few minutes to several hours. At lower temperatures around 250° C. an hour or so may profitably be used and at around 400° C., which is a preferred temperature, about 30 minutes or somewhat less is adequate. At still higher temperatures, times of only 5 or 10 minutes are sufficient.

The catalyst products can contain widely varying amounts of mangano-chromia-manganite, interspersant, second interspersant, and co-catalyst. In the final product, however, it can generally be stated that the amount by weight of first interspersant plus second interspersant is approximately equal to and can range up to ten times as great as the mangano-chromia-manganite. If co-catalysts are present they will ordinarily amount to from twice as much to one-tenth as much on a molar basis as the mangano-chromia-manganite.

It is to be noted that the life of catalytic aggregates can be extended by the inclusion of small amounts of an alkali or an alkaline earth. These have the effect of permitting the catalyst to regenerate itself in use through their functioning as a promoter for the re-oxidation of the mangano-chromia-manganite to a higher state of oxidation. Thus, based on the weight of mangano-chromia-manganite, there can be used between 0.05% and 10% of an alkali. The alkalis can include potassium, sodium, lithium, magnesium, calcium, strontium, and barium hydroxides, oxides, or carbonates. The alkali can be added at any appropriate stage in manufacture or after the catalyst has been finished. Again, the alkali can be added to a catalytic support.

The heat-treatment as described ordinarily causes a slight weakening of the pellets or supported catalyst. The temperature at no time goes high enough to result in a sintering which will strengthen the catalyst. The treatment, however, markedly increases the value of the catalyst and particularly increases its resistance to spalling in the presence of liquid water. As a consequence, the catalyst is resistant to water carried by the exhaust gases, to water which it may encounter in storage or in handling, and to water or water solutions which may be used for washing the catalyst to regenerate it after a period of use. Thus, the catalyst can be regenerated by washing with water or by washing with dilute, say around 10%, aqueous solutions of such acids as hydrochloric, nitric, acetic, formic and hydroxy acetic acids or with aqueous solutions or dispersions of catalytically active compounds.

The products as produced above are characterized by having a crystallite size preferably under 1000 Angstroms, preferably under 400, and better under 50, as above described. Additionally the products have the chemical characteristics above described which can be determined by X-ray or by conventional chemical analysis. Additionally the products are porous and will have a surface area by gas adsorption of above 50 M²/g. After use the catalysts will still have a comparatively high and effective surface area and the catalyst, after heating to 800° C. for three hours, will still have a surface area by gas adsorption in excess of 2 M²/g. Surface area is measured by the BET method.

The method of the present invention can be carried out in catalytic converters of types already designed including those for use on motor vehicles. Those skilled in the art can readily design a suitable converter which ideally should muffle sound at least to some extent and should provide for an adjustable air supply. The muffler in addition to acoustic insulation can also be insulated either interiorly or exteriorly with heat insulation so that the temperatures will reach the light-off temperatures as soon as possible.

In order that the invention may be better understood, reference should be had to the following illustrative examples:

EXAMPLE 1

(1) Dissolve 165 pounds, 3 pound moles, of metallic manganese as the nitrate in 750 gallons of water. That is to say, manganese nitrate is used (containing 165 pounds Mn) in amounts of 3 pound moles.

(2) Dissolve also in the same solution containing the manganese nitrate 300 pounds, 3 pound moles, of chromic acid anhydride ($CrO_3$).

(3) Adjust the volume to 800 gallons and the temperature to 35° C.

(4) Agitate the solution vigorously while adding vaporized anhydrous ammonia through a diffusion sparger at a rate of two pounds per minute until the precipitation is complete. Further addition of ammonia produces no further precipitate.

(5) Agitate the slurry for one hour then filter in a plate and frame press. Wash the filter cake in situ to remove dissolved salts.

(6) Dry in thin layers at 125°–150° C. for 16 hours.

(7) After drying, calcine the catalyst at 400° C. for three hours after reaching this temperature. Mangano-chromia-manganites thus prepared had a crystallite size of 50 Angstroms or less.

(8) Knead a 40 pound lot with 65 pounds of water containing 128 pounds of ammonium chromate. The resulting mangano-chromia-manganite had the formula $XCr_2O_n \cdot 2YMnO_m$ in which the ratio of Y:X is 3:12 and $n$ has the values of 2, 3, and 6 and $m$ of 1, 1.33, 1.5, 2, and 2.5. The development of the mangano-chromia-manganite crystals and of the values of $n$ and $m$ comes about during the subsequent drying, heating and calcining.

(9) Pulverize, mix with 1% of finely divided graphite and pill on a Stokes BB-2 rotary tableting machine.

(10) Heat the pellets thus obtained in thin layers in an oxidizing atmosphere at 400° C. for three hours. The catalyst pellets as thus prepared can be used in an automobile exhaust, either alone or with other catalysts, for abatement of the exhaust-fume problem.

Mangano-chromia-manganite catalysts as prepared above have crystallites which are largely in the form of cubes. They are very small but if the catalyst as prepared, prior to pelleting, is heated at 600° C. for three hours and then prepared for an electronmicrograph in the usual way, the electronphotomicrograph shows that substantially all of the discrete particles are cubes.

EXAMPLE 2

Proceed with catalyst preparation as in Example 1 through Step 7 and then follow the following procedure:

(8) Knead 100 pounds of material prepared as above with 65 pounds of water in which is slurried, and partially dissolved, 10 pounds of magnesium oxide.

(9) Dry, pulverize and mix the product thus prepared with 1% of graphite, and pellet.

(10) Heat the pellets thus obtained at 400° C. for three hours. The catalyst pellets thus prepared can be used for fume abatement according to the invention.

EXAMPLE 3

Catalyst preparation proceeded as in Example 1 through Step 7 and then:

(8) Knead 100 pounds of material prepared as above with 65 pounds of water in which there is dissolved 13 pounds of ammonium chromate.

(9) Dry, pulverize and mix with graphite, and pill.

(10) Heat the pellets thus obtained at 400° C. for three hours. Catalyst pellets thus prepared can be used for fume abatement according to the invention.

EXAMPLE 4

Catalyst preparation proceeded as in Example 1 through Step 7 and then:

(8) Knead 100 pounds of material prepared as above with 65 pounds of water in which there is dissolved 10 pounds of magnesium chromate.

(9) Dry, pulverize, mix with graphite, and pill.

(10) Heat the pellets thus obtained at 400° C. for three hours. The catalyst pellets thus prepared can be used for fume abatement according to the invention.

EXAMPLE 5

(1) Dissolve 110 pounds, 2 pound moles of metallic manganese as the nitrate in 750 gallons of water. Dissolve also in this same solution 32 pounds, 0.5 pound mole, of copper as the nitrate and 30 pounds, 0.5 pound mole, of nickel as the nitrate.

(2) Slurry in this solution 200 pounds of alumina hydrate, 0.5 micron size, low soda content.

(3) Dissolve also, in the same solution containing the manganese and copper nitrates and alumina hydrate, 300 pounds, 3 pound moles, of chromic acid anhydride ($CrO_3$).

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromia manganites having a crystallite size of about 50 Angstroms. The alumina and copper chromite formed are of similar size.

(9) Charge a 100 pound lot produced as above, together with 65 pounds of water in which is dissolved 13 pounds of ammonium chromate into a sigma-arm mixer and knead until the mass is homogenous and clay-like.

(10) Dry and pulverize the product and mix with 1% of finely divided graphite. Pellet to form 3/16 by 3/16 inch cylindrical tablets.

(11) Heat the pellets in air at 400° C. for three hours to effect structural orientation without significantly increasing the crystallite size of the mangano-chromia manganite, the alumina, the copper chromite or the chromic oxide contained.

Twenty-five pounds of a product prepared as above and using thirteen pounds of ammonium chromate in Step 9 is placed in a muffler designed for catalytic conversion of exhaust gases of an automobile. An air compressor driven by the car motor supplies about 130% excess, or more, over that stoichiometrically required for the oxidation of the exhaust gases.

The space velocity of the gases varied, depending upon motor speed, between 1,000 and 20,000. The light-off temperature of the catalyst is no higher than 260° C. and this temperature is reached initially by operating the motor at a fast idling speed. The catalyst operation continues between 425 and 650° C. It is noted in this connection that operating temperatures around 315 to 370° C. are more nearly ideal for long catalyst life and can be achieved by appropriate heat exchange and insulation of the muffler equipment.

After 341 hours of motor operation at variable speeds the catalyst still effects 80% conversion of the hydrocarbons and more than that conversion of carbon monoxide. Nitrogen oxides were not converted to any great extent. Less than 10% of the catalyst is lost after 341 hours and it is apparently in good physical condition. The catalyst can continue to operate for a longer period.

The catalyst can be used for reduction of nitrogen oxides by appropriate control of operating conditions. If the catalyst temperature is around 515° C. and air is not introduced with the exhaust gases but is added later, then in the reducing section before air addition typical conversions of nitrogen oxides are as follows:

| Parts per Million of Nitrogen Oxides in— | |
| --- | --- |
| Exhaust Gases Entering Converter | Effluent Gases |
| 630 | 5 |
| 340 | 6 |
| 230 | 11 |
| 310 | 42 |

The catalyst prepared using a larger amount of ammonium chromate in Step 9 leads to similar results.

EXAMPLE 6

Proceed with the catalyst preparation as in Example 5 except that in Step 9 use ten pounds of magnesium chromate instead of the annonium chromate. The catalyst thus prepared can be used for fume abatement according to the invention. The catalyst is excellent and has a light-off temperature of approximately 230° C.

EXAMPLE 7

Prepare a catalyst as in Example 5 except that in Step 9 use ten pounds of magnesium hydroxide instead of ammonium chromate.

Catalyst pellets prepared according to the procedure can be used for fume abatement as above described.

The catalyst has a light-off temperature of 280° C.

After 48 hours of operation at an artificially high temperature of 815° C. it still shows 76% conversion of hydrocarbons.

EXAMPLE 8

(1) Dissolve 110 pounds, 2 pound moles, of metallic manganese as the nitrate in 750 gallons of water. Dissolve also in the solution 63 pounds, 1 pound mole, of copper as the nitrate.

(2) Slurry 200 pounds of alumina hydrate in the solution.

(3) Dissolve 300 pounds, 3 pound moles, of chromic acid anhydride in the solution.

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromic manganites having a crystallite size of about 50 Angstroms. The alumina and copper chromite formed are of similar size.

(9) Charge a 100 pound lot produced as above, together with 65 pounds of water in which is dissolved 13 pounds of ammonium chromate into a sigma-arm mixer and knead until the mass is homogeneous and clay-like. Alternatively a similar product can be made using 33 pounds of ammonium chromate in this step.

(10) Dry and pulverize the product and mix with 1% of finely divided graphite. Pellet to form 3/16 by 3/16 inch cylindrical tablets.

(11) Heat in air at 400° C. for 3 hours.

Catalysts as thus prepared and using 13 pounds of ammonium chromate in Step 9 had a very low light-off temperature with ethane of 145° C. The light of temperature was 90° C. with 90% conversion with 1% carbon monoxide instead of ethane. They can be used for fume abatement according to the invention. Similar results are obtained using 33 pounds of ammonium chromate in Step 9.

EXAMPLE 9

Proceed as in Example 8 except that in Step 9 use pounds of magnesium chromate instead of the ammonium chromate. The light-off temperature of catalyst pellets thus made is about 250° C. They can be used according to the invention for fume abatement.

EXAMPLE 10

Proceed as in Example 8 except that in Stepe 9 use 10 pounds of magnesium hydroxide instead of the ammonium chromate. Catalyst pellets thus prepared can be used for fume abatement according to the invention.

EXAMPLE 11

(1) Dissolve 110 pounds, 2 pound moles, of metallic manganese as the nitrate in 750 gallons of water. Dissolve also in this same solution 32 pounds, 0.5 pound moles, of copper as nitrate and 30 pounds, 0.5 pound moles, nickel as nitrate.

(2) Add 200 pounds of alumina hydrate, 0.5 micron size, to the solution.

(3) Precipitate the manganese, nickel and copper by adding sufficient vaporized anhydrous ammonia to effect complete precipitation as determined by absence of formation of precipitate on addition of further quantities of ammonia.

(4) Add to the slurry 309 pounds, 3 pound moles, of chromium hydroxide powder, Guignet's Green.

(5) Stir the slurry for one hour and then filter. Wash the filter cake with water.

(6) Dry the filter cake at 135° C. for one hour.

(7) Raise the temperature of the dried product to 400° C. and calcine at that temperature for one hour to convert the manganate salts to mangano-chromia manganites having a crystallite size of about 50 Angstroms.

(8) Charge a 100 pound lot produced as above, together with 65 pounds of water in which is dissolved water containing 13 pounds of dissolved ammonium chromate and into a sigma-arm mixer and knead until the mass is homogeneous and clay-like. Alternatively a similar product can be made using 33 pounds of ammonium chromate in this step.

(9) Dry and pulverize the product and mix with 1% of finely divided graphite. Pellets to form 3/16 by 3/16 inch cylindrical tablets.

(10) Heat the pellets in air at 400° C. for three hours to effect structural orientation without significantly increasing the crystallite size of the mangano-chromia manganite contained. The catalyst as thus prepared can be used in an automobile exhaust for fume abatement.

EXAMPLE 12

Proceed as in Example 11 except that in Step 8 instead of ammonium chromate, dissolve 10 pounds of magnesium chromate in the water used. The catalyst thus prepared can be used for fume abatement according to the invention.

EXAMPLE 13

(1) Dissolve 110 pounds, 2 pound moles, of metallic manganese as the nitrate in 750 gallons of water. Dissolve also in this same solution 32 pounds, 0.5 pound mole, of copper as the nitrate and 30, 0.5 pound mole, of nickel as the nitrate.

(2) Slurry in this solution 200 pounds of titania. The titania is a pigment-grade of titanium dioxide, rutile form, and having a particle size below 1 micron.

(3) Dissolve in the solution 300 pounds, 3 pound moles, of chromic acid anhydride.

(4) Add water to bring the volume to 800 gallons and heat to raise the temperature to 35° C.

(5) Stir vigorously while adding vaporized anhydrous ammonia through a distributor until precipitation is complete.

(6) Stir the slurry and filter. Wash with water. Dry at 135° C. for two hours.

(7) Calcine at 400° C. for forty-five minutes. Manganochromia manganites contained in products thus prepared have a crystallite size of about 50 Angstroms. Similarly, alumina has a crystallite size of about 50 Angstroms and the titania has a considerably larger crystallite size and is about 100 to 150 Angstroms.

(8) The dried product is kneaded in 65 pounds of water containing 13 pounds of ammonium chromate.

(9) Dry and pulverize the product and mix with a suitable pelleting lubricant such as graphite, stearic acid, or another commonly used pelleting or tableting lubricant.

(10) Heat the pellets in air at 400° C. for thirty minutes. The catalyst as thus prepared can be used in processes of the invention for abating the fume nuisance of automotive vehicles and for similar purposes.

In Step 1 above the manganese nitrate can be replaced with an equal molar amount of manganese acetate, manganese chloride, manganese sulfate, or a mixture of any two or more of these. In Step 3, similarly, the chromium can be added using three pound moles of chromium nitrate, chromium chloride, chromium sulfate, or a mixture of any two or more of them.

EXAMPLE 14

(1) Dissolve 110 pounds of metallic manganese as the nitrate, 2 pound moles, in 750 gallons of water. Also dissolve 60 pounds of iron as the nitrate, 1 pound mole.

(2) To this solution add 200 pounds of alumina hydrate.

(3) Dissolve three pound moles of chromium nitrate in the solution.

(4) Add water to bring the volume to 800 gallons and raise the temperature to 35° C. Stir vigorously while adding finely divided, hydrated calcium hydroxide. This addition is continued until precipitation is complete.

(5) Stir the slurry for one hour and then filter. Wash with water. Dry at 135° C.

(6) Calcine at 400° C. for three hours.

(7) Charge 100 pounds of the product produced as above together with 65 pounds of water containing 13 pounds of ammonium chromate and knead.

(8) Dry and pulverize the product and pellet it.

(9) Heat the pellets in air at 600° C. for three hours. Pellets produced as above can be used in processes of the invention for the abatement of obnoxious and objectionable combustion products.

In the above example, Step 4 instead of using calcium hydroxide as a precipitant, add magnesium hydroxide, barium hydroxide, ammonium chromate, or anhydrous ammonia to effect substantially complete precipitation as described.

EXAMPLE 15

(1) Dissolve 110 pounds, equivalent to 2 pound moles, of metallic manganese as the nitrate in 750 gallons of water. It is noted that in all of the examples distilled or de-mineralized water should ordinarily be used if local water supplies are at all impure, particularly with respect to metallic impurities. Dissolve also in the same solution 32 pounds of copper as the nitrate and 30 pounds of nickel as the nitrate.

(2) Slurry also in the above solution a slurry prepared by adding 300 pounds of 60% nitric acid to a slurry of 300 pounds of alumina hydrate slurried in 300 gallons of water.

(3) Prepare in a separate vessel a solution of 456 pounds of ammonium chromate prepared by dissolving 300 pounds of chromic acid anhydride in water to which has been added ammonia equivalent to 12 pound moles of anhydrous ammonia.

(4) Transfer the ammoniacal ammonium chromate solution to the vessel in which the manganese, copper, nickel nitrate solutions are being rapidly agitated at 35° C.

(5) Adjust the slurry, if necessary, to obtain complete precipitation by supplementary additions of anhydrous ammonia.

(6) Stir the slurry for one hour and then filter. Wash the filter cake with water. Dry the filter cake at 135° C.

(7) Raise the temperature of the dried product to 400° C. and calcine at that temperature for 30 minutes. The crystallite size of the calcined product was not determined because it was below the range ordinarily measurable by X-ray analytical techniques. Certainly the crystallite size is well below 50 Angstroms.

(8) Charge a 100 pound lot produced as above together with 65 pounds of water in which is dissolved 13 pounds of ammonium chromate into a mixer and knead until homogeneous.

(9) Dry, pulverize, and pellet the product.

(10) Heat-treat the pellets in air at 400° C. for one hour. The catalyst as thus prepared can be used in processes of the invention for treatment of the exhaust of motor vehicles.

In the above example, the copper nitrate used in Step 1 can be replaced with a molecularly equivalent amount of nickel nitrate. Similarly, the nickel can be replaced with an equivalent amount of copper nitrate.

The calcination Step 7 above can be effected at temperatures of 350°, 450°, and 500° C. with substantially equivalent results.

Procedures as set out above can be modified by conducting the heat-treatment of Step 10 at 250° C. for five hours or at 800° C. for thirty minutes. The higher temperature results in crystallites of larger size and is less desirable. In this and in the other examples, crystallite sizes up to 400 and even 600 Angstroms can be reached and have value.

EXAMPLE 16

(1) Dissolve 110 pounds of metallic manganese as the nitrate, 2 pound moles, in 750 gallons of water. Dissolve also 32 pounds of copper as the nitrate, 0.5 pound mole, and 30 pounds of nickel as the nitrate, 0.5 pound mole.

(2) Dissolve also 300 pounds of chromic acid anhydride, 3 pound moles.

(3) Add water to bring the volume to 800 gallons and raise the temperature to 35° C.

(4) Agitate vigorously while adding vaporized anhydrous ammonia until precipitation is complete.

(5) After precipitation is complete, add to the slurry as a very finely divided powder, 200 pounds of calcium hydroxide. After completion of the addition of the calcium hydroxide, continue the stirring for an additional hour and then filter. Wash the filter cake with water.

(6) Dry the filter cake and then raise its temperature to 500° C. Calcine for thirty minutes. The crystallite size of products prepared in this manner are found to be less than 50 Angstroms.

(7) 100 pounds of the product produced as above is charged, together with 65 pounds of water in which was dissolved 13 pounds of ammonium chromate, into a mixer and kneaded.

(8) Dry and pulverize the product and pellet it.

(9) Heat-treat the pellets in air at 400° C. for three hours. A catalyst prepared as just described can be used in processes of the invention.

In Step 5 above, instead of using calcium hydroxide, the same procedure can be followed using the same amount by weight of finely divided titania in rutile or anatase crystal form, thoria, ceria, finely divided chromite ore, magnesium hydroxide, calcium silicate, magnesium aluminate, barium hydroxide, or strontium oxide.

EXAMPLE 17

(1) Dissolve 110 pounds of metallic manganese as the nitrate, 2 pound moles, in 750 gallons of water. Dissolve also in this solution 59 pounds of cobalt as the nitrate, 1 pound mole.

Proceed as in Example 5, steps 2 through 11. Similar results are obtained.

In Step 1 of the procedure, the cobalt nitrate can be replaced by an equimolar amount of copper, nickel, iron, zinc, cadmium, tin, or bismuth sulfate, nitrate, chloride, or acetate with comparable results.

EXAMPLE 18

(1) Dissolves 110 pounds of metallic manganese as the nitrate in 750 gallons of water. Dissolve also in this same solution 60 pounds of nickel as the nitrate.

(2) Slurry also in this solution 200 pounds of chromium hydroxide, Guignet's green.

(3) Add water to bring the volume to 800 gallons and heat to raise the temperature to 35° C.

(4) Agitate vigorously while adding vaporized anhydrous ammonia until precipitation is complete. Stir the slurry for one hour and filter. Wash the filter cake with water.

(5) Apply filter cake to a refractory support, activated alumina in the form of three to six mesh granules.

(6) Heat in air at 400° C. for two hours. The catalyst as thus prepared can be used for the treatment of combustion gases from hydrocarbon fuels, particularly such as those in diesel installations and power plants.

In the foregoing example, similar catalysts are prepared by using different supports instead of the activated alumina. Thus the procedure as described is followed but the coating is applied to:

(1) Porous ceramic spheres, tablets, or rings of porous ceramic,
(2) Etched nickel, Nichrome, and Inconel wire,
(3) Silica gel,
(4) Silica-alumina,
(5) Alundum,
(6) Pumice,
(7) Diaspore,
(8) Bauxite,
(9) Periclase,
(10) Zirconia,
(11) Titania,
(12) Diatomaceous earth,
(13) Calcium sulfate,
(14) Barium oxide, and
(15) Calcium oxide.

EXAMPLE 19

(1) Dissolve 110 pounds of metallic manganese as the nitrate in 750 gallons of water. Dissolve also in this same solution 32 pounds of copper as the nitrate and 30 pounds of nickel as the nitrate.

(2) Slurry in this solution 200 pounds of alumina hydrate, 0.5 micron particle size.

(3) Dissolve also in the solution 300 pounds of chromic acid anhydride. Add water to bring the volume to 800 gallons and adjust the temperature to 35° C.

(4) Stir vigorously while adding vaporized anhydrous ammonia until precipitation is complete. Continue to stir the slurry for one hour and then filter. Wash the filter cake with water and dry.

(5) Calcine the dried product at 400° C. for one hour.

(6) Into a sigma-arm mixer charge 100 pounds of the product produced above together with 65 pounds of water in which is dissolved 13 pounds of aluminum oxide as the nitrate. Knead until the mass is homogeneous.

(7) Dry and pulverize the product and pellet it.

(8) Heat the pellets in air at 400° C. for three hours. The heating converts the aluminum nitrate to the oxide. Under the conditions described the crystallite size of the manganite, the chromite, and the alumina is of the order of 50 Angstroms. If the catalyst is heated for an extended time at temperatures around 750° C. or above, there is a growth of particle size up to several hundred Angstroms. In the presence of significant quantities of silica the crystallite size will go as high as 400 Angstroms or even higher. If the crystallite size is markedly above 400 Angstroms, the products produced by such an example are not to be preferred.

Further products of the invention can be made by replacing the aluminum nitrate in Step 6 with a molecularly equivalent weight of hydrous titania gel, thorium nitrate, cerium nitrate, calcium hydroxide, calcium nitrate, calcium acetate, magnesium hydroxide, barium hydroxide, barium nitrate, and aluminum nitrate. Molecularly equivalent weights of the following can similarly be used: aluminum alcoholates like the ethylate, butylate, and propylate, zircon powder, aluminum hydroxide gel, zirconia gel, and cerium oxide.

EXAMPLE 20

(1) Dissolve 165 pounds, 3 moles, of metallic manganese as the nitrate in 750 gallons of water.

(2) Dissolve also in the same solution containing the manganese, 100 pounds, 1 mole, of chromic acid anhydride.

(3) Slurry in this solution 200 pounds of alumina hydrate, 0.5 micron size, low soda content.

(4) Add water to bring the volume to 800 gallons and heat to raise the temperature to 35° C.

(5) Agitate vigorously while adding vaporized anhydrous ammonia through a diffusion sparger at two pounds per minute until precipitation is complete as evidenced by no further addition of ammonia producing no further precipitate.

(6) Stir the slurry for one hour and then filter. Wash the filter cake, in situ, with water.

(7) Dry the filter cake at 135° C. for one hour.

(8) Raise the temperature to 400° C. and calcine at that temperature for one hour to convert the manganate salts to mangano-chromic manganites and the alumina hydrate to alumina, each having crystallite sizes of about 50 Angstroms.

(9) Charge a 100 pound lot produced as above, together with 65 pounds of water in which is dissolved 13 pounds of ammonium chromate into a sigma-arm mixer and knead until the mass is homogeneous and clay-like. Alternatively a similar product can be made using 33 pounds of ammonium chromate in this step.

(10) Dry and pulverize the product and mix with 1% of finely divided graphite. Pellet to form $3/16$ by $3/16$ inch cylindrical tablets.

(11) Heat the pellets in air at 400° C. for three hours to effect structural orientation without significantly increasing the crystallite size of the mangano-chromia manganite, the alumina, or the other crystal species contained. The catalyst can be used for fume abatement.

EXAMPLE 21

Prepare a catalyst as in Example 20 through Step 8 then proceed according to the following procedure.

(9) Charge an 80 pound lot produced as above together with 20 pounds of a separately prepared copper-nickel chromite ($CuO \cdot CuCr_2-O_4 NiO \cdot NiCr_2O_4$) and 65 pounds of water in which is dissolved 33 pounds of ammonium chromate into a sigma-arm mixer and knead until the mass is homogeneous and clay-like.

The nickel and copper chromite were prepared as follows:

(a) Dissolve 33 pounds of copper as copper nitrate and 30 pounds of nickel as nickel nitrate in 200 gallons of water.

(b) Dissolve 100 pounds of chromic acid anhydride in the solution prepared in Step a.

(c) Add water to bring the volume to 270 gallons and adjust the temperature to 35° C.

(d) Agitate vigorously while adding vaporized anhydrous ammonia through a diffusion sparger at a rate of one pound per minute until precipitation is complete as evidenced by further addition of ammonia producing no further precipitation.

(e) Agitate the slurry for one hour and then filter. Wash the filter cake with water.

(f) Dry the filter cake at 150° C. for 8 hours.

(g) Raise the temperature of the dried product to 400° C. and calcine at that temperature for one hour to convert the basic chromate salts to chromites having a crystallite size of about 50 Angstroms.

(10) Dry for 16 hours at 250° C. then pulverize the product and mix with 1% of finely divided graphite. Pellet to form $3/16$ by $3/16$ inch cylindrical tablets.

The catalyst as thus prepared can be used directly as in a catalytic muffler for an internal combustion engine. The heat of the gases will effect the desired heat treatment but this is not preferred because the catalyst may incidentally be subjected to liquid water with some damage. It is better before use to heat the catalyst 250 or 300° C. for three hours.

EXAMPLE 22

(1) Dissolve 110 pounds, 2 pound moles, of metallic manganese as the nitrate in 750 gallons of water. Dissolve also in this same solution 32 pounds, 0.5 pound mole, of copper as the nitrate and 30 pounds, 0.5 pound mole, of nickel as the nitrate.

(2) Slurry in this solution 200 pounds of alumina hydrate, 0.5 micron size, low soda content.

(3) Dissolve also, in the same solution containing the manganese and copper nitrates and alumina hydrate, 300 pounds, 3 pound moles, of chromic acid anhydride ($CrO_3$).

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromia-manganite having a crystallite size of about 50 Angstroms. The alumina and copper chromite formed are of similar size.

(9) Charge a 100 pound lot produced as above, together with 65 pounds of water in which is dissolved 33 pounds of ammonium chromate into a sigma-arm mixer and knead until the mass is homogeneous and clay-like.

(10) Dry and then calcine at 300° C. and then pulverize the products and mix with 1% by weight of finely divided graphite. Pellet to form 3/16 by 3/16 inch cylindrical tablets.

(11) Heat the pellets in air at 400° C. for three hours to effect structural orientation without significantly increasing the crystallite size of the mangano-chromia-manganite, the alumina, the copper chromite or the chromic oxide contained.

Thirty-three pounds of a product prepared as above is placed in a muffler designed for catalytic conversion of exhaust gases of an automobile. The muffler is similar to a conventional auto muffler with exhaust intake and outlet and provided with dividing vertical baffles which form transverse chambers into which the catalyst is placed. Cooling tubes carrying ambient air runs through the length of the muffler and keep the temperature from becoming excessive. An air compressor driven by the car motor supplies about 30% excess, or more, over that stoichiometrically required for the oxidation of the exhaust gases.

The muffler as described was installed on a 1958 Oldsmobile having a V-8 cylinder engine. This was operated for 15,814 miles over typical terrain encountered in the eastern part of the United States. The light-off temperature of the catalyst as it was applied to the car was about 150° C. Under idling conditions of the motor the CO clean-up was in excess of 90%. Clean-up of olefinic and paraffinic hydrocarbons in the automobile exhaust under idling conditions was also in excess of 90%. The engine was operated at various speeds up to and in excess of 50 miles per hour but at 50 miles per hour a test of the completeness of clean-up of the carbon monoxide olefinic and paraffinic carbons was examined. Under these conditions CO removal was in excess of 95% and a high degree of clean-up was obtained for the hydrocarbons.

The automobile was periodically examined for performance of the catalyst after every thousand miles. At the end of 15,814 miles the light-off temperature was about 250° C. Under idling conditions the carbon monoxide clean-up was in excess of 90% and the hydrocarbon clean-up was in excess of 60%. Also, after this same period of usage the automobile was examined at 50 miles per hour and carbon monoxide clean-up was in excess of 80% and hydrocarbon clean-up was in excess of 80%.

EXAMPLE 23

(1) Dissolve 110 pounds, 2 pound moles, of metallic manganese as the nitrate in 750 gallons of water. Dissolve also in this same solution 32 pounds, 0.5 pound mole, of copper as the nitrate and 30 pounds, 0.5 pound mole, of nickel as the nitrate.

(2) Slurry 300 pounds of alumina hydrate 0.5 micron size low soda content in 200 gallons of water in which is dissolved 150 pounds of nitric acid, 100% $HNO_3$. This nitric acid solution with an alumina hydrate suspension is heated to the boiling point and maintained at this temperature for 3 hours. It is then cooled to 50° C. and added to the nitrate solution described in item 1. The heat treatment converts at least a portion of the alumina to the boehmite crystal form and in the form of small colloidal platelets.

(3) Dissolve also, in the same solution containing the manganese and copper nitrates and alumina hydrate, 300 pounds, 3 pound moles, of chromic acid anyhydride ($CrO_3$).

(4) Add water to bring the volume to 800 gallons and heat to raise the temperature to 35° C.

(5) Agitate vigorously while adding vaporized anhydrous ammonia through a distributor at two pounds per minute until precipitation is complete as evidenced by further addition of ammonia producing no further precipitation.

(6) Stir the slurry for one hour and then filter. Wash the filter cake with water.

(7) Dry the filter cake at 135° C. for one hour.

(8) Raise the temperature of the dried product to 400° C. and calcine at that temperature for one hour to convert the manganate salts to mangano-chromia manganite having a crystallite size of about 50 Angstroms. The crystallites of the alumina, and of the copper and nickel chromites formed, are of similar size.

(9) Charge a 100 pound lot produced as above, together with 65 pounds of water in which is dissolved 10 pounds of magnesium acetate into a sigma-arm mixer and knead until the mass is homogeneous and clay-like.

(10) Dry and pulverize the product and mix with 1% of finely divided graphite. Pellet to form 3/16 by 3/16 inch cylindrical tablets.

(11) Heat the pellets in air at 400° C. for three hours to effect structural orientation without significantly increasing the crystallite size of the mangano-chromia-manganite, the alumina, the copper chromite or the chromic oxide contained.

The crystallite size of crystallites in the product was less than 50–60 Angstroms and this product had a small crystallite size even after extended heating at 800° C. This is shown by X-ray examination which shows the crystallite size after three hours at 800° C. to be under 500 Angstroms. This catalyst has very high activity even after extended heating.

EXAMPLE 24

The series of steps described above in Example 22 were followed exactly except that Step 2 was as follows:

(2) Slurry in the above solution 200 pounds of a silica aerogel having a particle size below one-half micron. There can be used instead an equal weight of aerogel of the Kistler Patent 2,093,454 or of a fumed product made by volatilizing silicon chloride and hydrolyzing. Alternatively silica sols can be used to introduce an equivalent weight of silica of colloidal size such as those sols shown in Bechtold and Snyder 2,574,902, Rule 2,577,484, Davison's Legal Patent 2,724,701, and Monsanto's White Patent 2,375,738.

The catalyst produced according to this example can be used as are the others of the invention but it finds its principal utility when used at temperatures no higher than about 700° C.

EXAMPLE 25

(1) Charge 500 pounds of 4 to 8 mesh activated alumina to a cylindrical vessel which is completely closed except for valved openings at the bottom and top of the vessel.

(2) Force superheated steam at 150 to 250° C. through the bed of activated alumina until the entire bed of activated alumina is above 125° C.

(3) In a separate vessel prepare, and adjust to 30° C., 1000 gallons (sufficient to completely fill the vessel of Item 1 and all interconnecting piping) of an aqueous solution composed of 3000 parts water, 110 parts manganese as the nitrate, 33 parts copper as the nitrate, 30 parts of nickel as nitrate, and 300 parts chromic acid anhydride, $CrO_3$.

(4) After the activated alumina has been uniformly heated to above 125° C. close the exit port of the vessel containing the alumina and then simultaneously close the inlet steam valve and open the valve admitting the solution prepared in Item 3 above.

(5) As the temperature in the vessel drops below the point at which condensation of the steam atmosphere takes place, the solution will be drawn into the vessel and into the interstices and pores of the activated alumina.

(6) After the solution has remained on the granules for 10 minutes, open the top port and drain the excess solution from the granules.

(7) Feed into the granules a gaseous mixture composed of 3% anhydrous ammonia in nitrogen until there is no further reaction of ammonia with the granules and with the adsorbates on the granules. This point can be determined both by lack of temperature rise as the gases pass through the granules and by the breakthrough of ammonia in the exit gas. The temperature of the incoming gas mixture and the percentage of ammonia in the gas can be varied to control the temperature of the granules within the range of 40–70° C.

(8) Stop the flow of ammonia-nitrogen mixed gas and feed heated air to the vessel. Raise the temperature of the granules to 300° to 400° C. and maintain this range for one hour. The off-gas from the vessel can be processed for the recovery of valuable salts and dust evolved from the granules during this calcination.

(9) Discharge the impregnated and calcined granules. Catalyst prepared according to this example is useful for fume abatement.

A similar catalyst can be made in which the activated alumina is first treated with an aqueous solution of potassium carbonate containing 2 grams of potassium carbonate per liter. Thereafter the excess potassium carbonate solution is drained off and the granules are dried to leave the potassium carbonate on the surface. The remainder of the process of the above example can be followed just as shown.

Instead of using the indicated amount of potassium carbonate similar results can be obtained using sodium carbonate, lithium carbonate, calcium hydroxide, barium hydroxide, and other alkalis shown above, the amounts in each instance being those just indicated.

EXAMPLE 26

(1) Dissolve 275 pounds, 5 pound moles, of metallic manganese as the nitrate in 750 gallons of water. Dissolve also in this same solution 32 pounds, 0.5 pound mole, of copper as the nitrate and 30 pounds, 0.5 pound mole, of nickel as the nitrate.

(2) Dissolve also in the same solution 200 pounds, 2 pound moles, of chromic acid anhydride ($CrO_3$).

(3) Add water to bring the volume to 800 gallons and heat to raise the temperature to 35° C.

(4) Agitate vigorously while adding vaporized anhydrous ammonia through a distributor at two pounds per minute until precipitation is complete as evidenced by further addition of ammonia producing no further precipitation.

(5) Stir the slurry for one hour and then filter. Wash the filter cake with water.

(6) Dry the filter cake at 135° C. for hour.

(7) Raise the temperature of the dried product to 400° C. and calcine at that temperature for one hour to convert the manganese salts to mangano-chromia-manganites having a crystallite size of about 50 Angstroms. At the same time the calcination converts manganese hydroxide to manganese oxides which serve as potential components of the ionic crystals and lend desired properties. These are present because an excess of manganese is used in Step 1 over that required to form manganese chromite of Mn:Cr ratio of 3:2. The calcination also converts the basic nickel and copper chromates to chromites.

(8) Charge a 100 pound lot produced as above, together with 65 pounds of water in which is dissolved 40 pounds of anhydrous aluminum nitrate into a sigma-arm mixer and knead until the mass is homogeneous and claylike.

(9) Dry the product and calcine at 400° C. for 2 hours to decompose the nitrate and form aluminum oxide, pulverize and mix with 1% of finely divided graphite. Pellet to form ⅛ by ⅛ inch cylindrical tablets.

(10) Heat the pellets in air at 400° C. for 3 hours to effect structural orientation.

The product prepared as above can be used effectively for the catalytic conversion of exhaust gases of an automobile. Like many other of the example catalysts, this is particularly good for use at high temperature and has a very low light-off temperature. It can accordingly be used to raise the temperature of exhaust gases of an automobile to make them more suitable for conversion in a conventional catalytic muffler or other device.

Catalysts of similar utility and character can also be made replacing in Step 8 the aluminum nitrate there used with the same weight of thorium nitrate, cerium nitrate, magnesium nitrate, lanthanum nitrate, and any other of the interspersants above described.

EXAMPLE 27

(1) 250 parts by weight of chromic acid anhydride and 140 parts by weight of $NH_3$ are dissolved in 610 parts by weight of water.

(2) A second solution is made containing 77 parts by weight of manganese as manganese nitrate and 923 parts by weight of water.

(3) 300 parts by weight of activated bauxite of 4 to 8 mesh granules is placed in a perforated basket and dipped into the solution prepared in Item 1 above. It is then removed, drained for three minutes and then dipped into the solution described in Item 2 above. After remaining in the solution for about 1 minute the basket is removed and the bauxite is drained and dried. It is noted that the activated bauxite is an article of commerce which is prepared by heating bauxite ore under oxidizing conditions.

(4) The dried granules are then heated to 250° C. for 30 minutes. They are then cooled. The catalyst thus prepared has a ratio Mn:Cr of 3:5.2. It is to be noted that the Mn:Cr ratio is that of the reactants used because unlike aqueous precipitations there is no loss of chromium during the processing. The catalyst is useful for oxidation and reduction reactions at elevated temperatures and is particularly useful for the treatment of automobile exhaust gases.

EXAMPLE 28

A procedure was followed as in Example 27 except for the following differences:

(1) The first solution—100 parts of chromic acid anhydride, and 28 parts of $NH_3$ are dissolved in 886 parts of water.

(2) 220 parts of manganese as manganese nitrate are dissolved in 780 parts by weight of water.

(4) The catalyst produced carries a mangano-chromia-manganite having an Mn:Cr ratio of 3:0.75.

EXAMPLE 29

Catalysts are prepared as in Examples 27 and 28 above but making the following changes in the numbered items:

(1) In the first solution in each of Examples 27 and 28 there is included an additional 100 parts by weight of chromic acid to supply the chromium required for the copper and nickel chromites to be formed.

(2) To the second solution there is added 25 parts by weight of copper as copper nitrate and 20 parts by weight of nickel as nickel nitrate.

Other co-catalysts as described above can similarly be used in the second solution.

(3b) The dried catalyst is then calcined at 250° C. for 30 minutes. The resulting catalysts are suitable for use in oxidation and reduction reactions and especially for treating automobile exhaust gases. Instead of the final calcination one can instead rely upon the heat present in the catalytic reactor as is, of course, true in the numerous examples above, but it is ordinarily preferred to effect the calcination as here described.

If the product is to be used in an automobile exhaust muffler without prior calcination, it would be preferred to use the acetate of the interspersant rather than the nitrate and, of course, other salts which would give unobjectionable products of combustion can be used as can colloids which do not need to decompose further such as alumina sols.

Any of the interspersants above described can, of course, be used in this last step in amounts as already taught above.

It will aslo be understood that in following the procedure in the present example, the first interspersant as described in Example 30 can be omitted so that only the interspersant of Step 3a is used.

It is further to be understood that in any of Examples 27 through 31 one can use the same weight of any of the other supports previously described. Thus the procedure as shown in the examples can be carried out using the indicated weight of alundum as granules, activated alumina as granules, and titania granules.

EXAMPLE 30

Catalysts are prepared as in Examples 27, 28, and 29 above but inserting the following steps after Item 3:

(3a) A third solution is prepared using 54 parts by weight of aluminum as aluminum nitrate dissolved in 946 parts by weight of water. The drained catalyst from Item 3 is placed in this third solution for 1 minute, removed, and drained before the drying step described above.

It will be understood that instead of using aluminum nitrate—which results in aluminum oxide as an interspersant—there can instead be used any of the other interspersants described above. These can of course be added as colloids or as heat decomposable salts.

EXAMPLE 31

The processes of each of Examples 27, 28, 29, and 30 can be modified by the addition of an interspersant after calcination. This can be done by inserting in the sequence of items given in each of the foregoing examples the following:

(4a) A solution is prepared by dissolving 69 parts by weight of barium as barium nitrate in 931 parts by weight of water. The calcined catalyst from the preceding step is dipped into this solution, allowed to remain for 1 minute, removed, drained and dried.

EXAMPLE 32

(1) 165 parts by weight of manganese as the nitrate, 600 parts by weight of chromic acid anhydride, 500 parts by weight of aluminum hydrate as finely divided powder, 28 parts by weight of nickel as the nitrate, and 31 parts by weight of copper as the nitrate, are all dry-mixed together.

(2) The mixture is agitated and simultaneously heated and a reducing gas composed of hydrogen and CO diluted with nitrogen is fed to the mixing area and the fusion is continued until the mass has finished reacting and has solidified.

(3) The solidified product is cooled, crushed, and screened to produce a catalyst particularly useful for treatment of automobile exhaust gases.

EXAMPLE 33

A catalyst was prepared as in Example 32 with the exception that prior to the heating of Step 2, 7000 parts by weight of alumina as 4 to 8 mesh activated granules is also incorporated into the mixture to act as a support material.

The invention claimed is:

1. A process for treatment of automobile exhaust gases comprising passing said gases over a catalyst which is mangano-chromia-manganite, the crystallites of which are kept apart by crystallites of a refractory which melts above 1000° C., said mangano-chromia-manganite being a complex product of the character described having the empirical formula:

$$XCr_2O_n \cdot 2YMnO_m$$

where the ratio of $Y:X = 3:0.5$ to $3:30$
$n = 2, 3,$ and $6,$ and
$m = 1, 1.33, 1.5, 2,$ and $2.5,$ the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$.

2. A process as defined in claim 1 wherein the exhaust gases are first mixed with air and then passed over the mangano-chromia-manganite catalyst to oxidize carbon monoxide and hydrocarbons.

3. A process as defined in claim 1 wherein the exhaust gases are first passed over a portion of the mangano-chromia-manganite catalyst to reduce nitrogen oxides, then air is added to the treated gas stream and the mixture is passed over a second portion of the mangano-chromia-manganite catalyst to oxidize carbon monoxide and hydrocarbons.

4. A process as defined in claim 1 wherein the mangano-chromia-manganite is composed of aggregates of crystallites no larger than 1000 Angstroms.

5. A process for treatment of automobile exhaust gases comprising passing said gases over a mangano-chromia-manganite catalyst of the character described having the empirical formula:

$$XCr_2O_n \cdot 2YMnO_m$$

where the ratio of $Y:X = 3:0.5$ to $3:1.5$ and $3:3.5$ to $3:30,$
$n = 2, 3,$ and $6,$
$m = 1, 1.33, 1.5, 2,$ and $2.5,$ the formula being a summation of the proportion of its content of $MnO$, $MnO_2$, $Mn_2O_3$, $Mn_3O_4$, $Mn_2O_5$, $Cr_2O_3$, $Cr_2O_3 \cdot MnO_2$, $CrO \cdot Mn_2O_3$, $CrO_3 \cdot MnO$, $Cr_2O_3 \cdot MnO$.

6. A process as defined in claim 5 wherein the mangano-chromia-manganite is composed of aggregates of crystallites no larger than 1000 Angstroms.

References Cited by the Examiner

UNITED STATES PATENTS 2,025,140  12/1935  Wenzel _____ 23—2

OTHER REFERENCES

Mellor, "A Comprehensive Treatise on Inorganic and Theoretical Chemistry," Longmans, Green & Co., New York, N.Y., volume 12, 1932, pages 274 and 280.

Sidgwick, "The Chemical Elements and Their Compounds," Oxford University Press, London, volume 2, 1950, page 1273.

OSCAR R. VERTIZ, *Primary Examiner.*

EARL C. THOMAS, *Examiner.*